(12) United States Patent
Christidis et al.

(10) Patent No.: US 9,255,037 B2
(45) Date of Patent: Feb. 9, 2016

(54) CURING PROCESS FOR CONCRETE

(75) Inventors: Chris Christidis, Lyons (FR); Fabien Perez, Vaulx Milieu (FR); Olivier Watt, Saint Jean de Soudain (FR)

(73) Assignee: LAFARGE, Paris (FR)

( * ) Notice: Subject to any disclaimer, the term of this patent is extended or adjusted under 35 U.S.C. 154(b) by 0 days.

(21) Appl. No.: 14/116,731

(22) PCT Filed: May 10, 2012

(86) PCT No.: PCT/EP2012/058686
§ 371 (c)(1),
(2), (4) Date: Nov. 8, 2013

(87) PCT Pub. No.: WO2012/152887
PCT Pub. Date: Nov. 15, 2012

(65) Prior Publication Data
US 2014/0079889 A1    Mar. 20, 2014

(30) Foreign Application Priority Data
May 10, 2011  (FR) .................................. 11 53983

(51) Int. Cl.
 C04B 40/04   (2006.01)
 C04B 41/00   (2006.01)
 C04B 41/48   (2006.01)
 C04B 41/63   (2006.01)

(52) U.S. Cl.
 CPC ............... *C04B 40/04* (2013.01); *C04B 41/009* (2013.01); *C04B 41/4803* (2013.01); *C04B 41/63* (2013.01)

(58) Field of Classification Search
 USPC ........................................................ 427/427.4
 See application file for complete search history.

(56) References Cited

U.S. PATENT DOCUMENTS

| 4,582,889 A * | 4/1986 | Yamaguchi et al. ............ 528/59 |
| 5,037,873 A * | 8/1991 | Heaton ........................ 524/267 |
| 5,746,810 A * | 5/1998 | Suzuki .............................. 106/2 |
| 2004/0138328 A1* | 7/2004 | Kohr et al. ................... 522/149 |

FOREIGN PATENT DOCUMENTS

| JP | 2-302383 | 12/1990 |
| JP | 7-025680 | 1/1995 |
| JP | 10-287482 | 10/1998 |

OTHER PUBLICATIONS

International Search Report as issued for International Application No. PCT/EP2012/058686, dated Jul. 24, 2012.

\* cited by examiner

*Primary Examiner* — Nathan T Leong
(74) *Attorney, Agent, or Firm* — Pillsbury Winthrop Shaw Pittman LLP

(57) ABSTRACT

A curing process of a concrete element including at least partially coating the element with a curing composition, the composition including a solvent and a thickening agent, the thickening agent being insoluble at a pH greater than 12 and being soluble in the solvent for a solubility range of pH, the upper limit of the solubility range being less than 11.

11 Claims, 1 Drawing Sheet

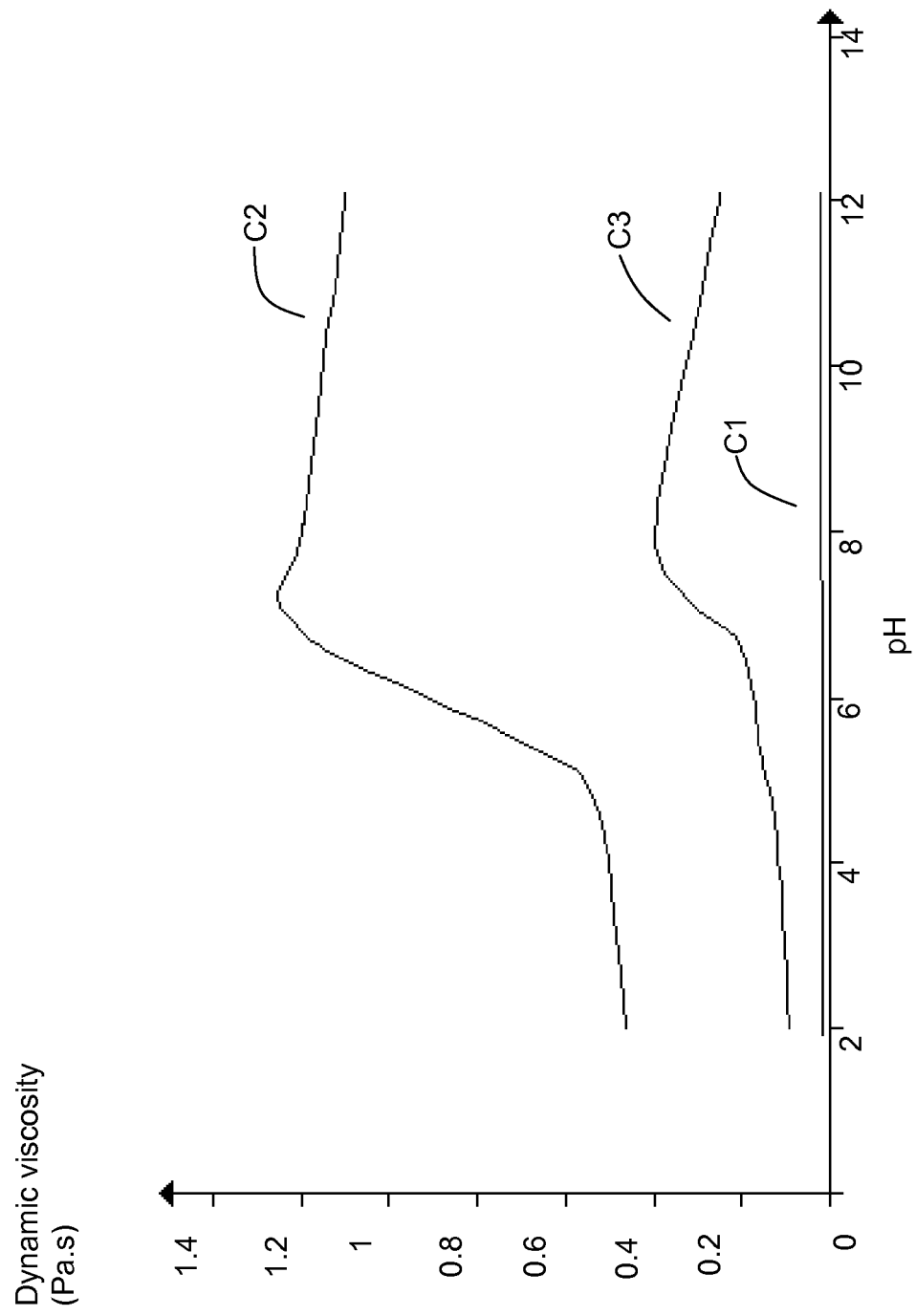

CURING PROCESS FOR CONCRETE

CROSS-REFERENCE TO RELATED APPLICATIONS

This is the U.S. National Stage of PCT/EP2012/058686, filed May 10, 2012, which in turn claims priority to French Patent Application No. 1153983, filed May 10, 2011, the entire contents of both applications are incorporated herein by reference in their entireties.

The invention relates to a curing process for concrete.

The chemical hydration reaction of cement requires a sufficient quantity of water as well as suitable temperature conditions to provide the concrete with desired compressive strength and durability properties. Unfavourable climate conditions during the casting of exposed concrete can contribute to rapid loss of water, for example on the exposed surfaces of a slab. Hydration reactions may therefore be incomplete and the concrete element may be less resistant to wearing and abrasion.

The curing process of concrete is a process making it possible to retain sufficient levels of humidity and/or temperature over a given period. The cure therefore comprises protection of the concrete against losses of humidity beginning when the concrete is placed until it sets and during the first phase of the hardening, which is generally for several days.

With this aim, the curing process may involve the use of barriers against the wind; spraying water on the concrete; depositing water-imbibed cloth or surface plastic films or impermeable paper on the concrete; or the application on the concrete of a product or liquid curing agent which, when drying forms a membrane on the concrete reducing the evaporation of water.

Curing agents are often based on solutions in organic solvents or aqueous dispersions of materials, for example, waxes, paraffin, resins, chlorinated rubber. They are therefore generally applied by spraying. Certain curing products are in the form of wax and are generally applied using a roller.

Concrete surfaces are generally permeable to liquid water and water vapour.

The porosity or volume of voids in a pervious concrete is sufficiently high so that water can flow through the pores of the concrete. Pervious concrete comprises draining concretes. Pervious concrete generally has few fine aggregates and there is an important interconnection between the voids in the concrete. The open porosity of a known pervious concrete is generally greater than 20%. Pervious concrete may be used for slabs in parking zones, zones with low levels of traffic, streets in residential areas and pedestrian passages.

A considerable amount of the surface area of pervious concrete is exposed to air due to the high porosity of the concrete. Water losses in a pervious concrete are therefore considerable when climate conditions are unfavourable. Nevertheless, known curing processes may not necessarily be suitable for pervious concrete. Water-spraying techniques are not very efficient as the concrete is pervious by nature. The operation of covering the concrete surface with plastic tarpaulins is delicate because the tarpaulins have to be rapidly put in place after placing the fresh concrete. Moreover, because the surface of pervious concrete is generally irregular it is difficult to evenly cover with plastic tarpaulins. Moreover, known curing products in the form of emulsions are not suitable for a pervious concrete because they tend to rapidly flow through the concrete pores.

Known curing products in the form of waxes are not suitable either for pervious concrete because they must be applied using a roller, which can not be carried out easily on the irregular surfaces of pervious concrete. Furthermore, the removal of known curing products is generally carried out using hard brushes, which may impair the exposed side of an element of pervious concrete.

There exists therefore a need for a curing process adapted to a pervious concrete.

With this aim, the present invention provides a curing process of a concrete element comprising at least partially coating the element with a curing composition, said composition comprising a solvent and a thickening agent, said thickening agent being insoluble at a pH greater than approximately 12 and being soluble in the solvent for a solubility range of pH, the upper limit of the solubility range being less than approximately 11.

The process of the present invention is particularly applicable to pervious concrete.

In this description including the accompanying claims, unless otherwise specified, proportions given as percentages correspond to mass proportions. Nevertheless, the porosity of a concrete is expressed by a percentage relative to the volume of the final hardened concrete.

The curing composition suitably has a first dynamic viscosity less than 0.8 Pa·s (0.8 Pascal second i.e. 800 centipoises) when the pH is within the solubility range and a second dynamic viscosity when the pH is between the upper limit of the solubility range and approximately 12. The second dynamic viscosity is preferably greater than, 2 to 5 times the first dynamic viscosity. Preferably, the dynamic viscosity is at a maximum for a pH between approximately 5 and approximately 12, more preferably between approximately 6 and approximately 10.

The process of the present invention may provide any one of the following advantages:
- the formation of a substantially waterproof and/or hydrophobic film covering the concrete surface which can result in a reduction of water losses in the concrete;
- depending on weather conditions, the curing process may be used instead of water soaked cloths, plastic films or water proof paper.
- the application of the curing composition is simple as it may be carried out by spraying; and
- the removal of the curing composition applied by the process according to the present invention is a simple operation, in particular it can be carried out by abrasion.

The curing composition comprises a solvent. Suitably the composition comprises from 40% to 99.9% by mass, preferably from 50% to 95%, more preferably 60% to 90%, most preferably 80% to 90% by mass of the solvent. The solvent may be water, an alcohol or a derivative thereof or a mixture thereof. Suitably the alcohol is ethanol. Suitably, the derivative of the alcohol is ethylene glycol. The preferred solvent is water.

A curing compound is soluble in a solvent when at least 0.5 gramme, preferably at least 1 gramme, more preferably at least 2 grammes, most preferably at least 5 grammes, of the compound is dissolved per liter of the solvent at 20° C. and at a given pH. A compound is insoluble in a solvent when less than 0.5 gramme, preferably less than 0.1 gramme, of the compound is dissolved per liter of the solvent at 20° C. and at a given pH.

The solvent is generally an amphiprotic solvent, denoted HS, capable of capturing or releasing a proton.

The autoprotolysis equilibrium of the solvent is:

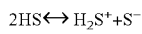

The pH of the solvent is defined by the following relation:

$$pH = -\log(a(H_2S^+))$$

wherein $a(H_2S^+)$ is the activity of the chemical species $H_2S^+$. Generally the activity of the chemical species $H_2S^+$ is considered to be equal to the concentration of the chemical species $H_2S^+$ in the solvent.

The curing composition comprises a thickening agent. Suitably the composition comprises from 0.1% to 5%, preferably 0.5% to 4%, more preferably 0.75% to 3%, most preferably 1 to 2% by mass, expressed as dry extract of the thickening agent.

The thickening agent used in the process of the present invention is a compound which, when added to a solution, increases the dynamic viscosity of the solution. By way of example, the thickening agent induces an increase of at least 10% of the dynamic viscosity when 0.5% by mass expressed as dry extract, of the thickening agent is added to the solution at a suitable pH for example, within the solubility range, at an acid pH, for example up to pH 6 to 7 for Chitosan.

The present invention is based on the use of a thickening agent, the thickening property of which varies with the pH of the solution comprising the thickening agent. In particular, the thickening agent is substantially soluble in the solvent for a pH within the solubility range the upper limit of which is less than 11, the dynamic viscosity of the curing composition is low at such pH values. Preferably, there is no, or very little, thickening action by the thickening agent within this range of pH. In particular, the dynamic viscosity of the curing composition within the said range of pH is generally less than approximately 0.8 Pa·s, preferably less than approximately 0.6 Pa·s, more preferably less than approximately 0.5 Pa·s, and especially less than approximately 0.4 Pa·s.

For a pH higher than 12, the thickening agent is substantially insoluble in the solvent and generally precipitates in the solvent. The thickening agent may form lumps or a gel depending on the concentration of the thickening agent in the solvent. Between the upper limit of the solubility range and the pH equal to 12, the solubility of the thickening agent in the solvent decreases. The dynamic viscosity of the curing composition then increases and reaches the second dynamic viscosity. Preferably, the second dynamic viscosity of the curing composition is greater than 2 to 5 times, the first dynamic viscosity. The pH of fresh concrete being generally basic, when the curing composition is spread on the fresh concrete element, the pH of the curing composition increases upon contact with the fresh concrete, resulting in that the dynamic viscosity of the curing composition increases. The curing composition then tends to remain on the surface of the concrete and not flow, or only flow a little through the concrete pores.

Preferably, the curing composition has a first dynamic viscosity less than a 0.8 Pa·s when the pH is in the solubility range and second dynamic viscosity greater than 2 to 5 times the first dynamic viscosity when the pH is between the upper limit of the solubility range and 12.

The thickening agent may comprise a gelling agent. The gelling agent induces the formation of a gel only when the curing composition is in contact with the concrete. In this case, when the curing composition onto the concrete surface, the gelling agent induces the formation of a gel in which the liquid phase comprises for example an emulsion of the film-forming agent and/or hydrophobic agent. The curing composition then does not completely flow through the pores of the pervious concrete.

The thickening agent may comprise polyamines or derivatives thereof; polyimines or derivatives thereof; and mixtures thereof. When the thickening agent is a polyamine, it preferably comprises a polysaccharides for example chitosan (in particular the product commercialised by France Chitine under the name of Chitosan 342).

The curing composition used in the process of the present invention may comprise from 40% to 99.9%, preferably 50% to 95%, more preferably 60% to 90%, most preferably 80% to 90% by mass of a solvent; and from 0.1% to 5%, preferably 0.5% to 4%, more preferably 0.75% to 3%, most preferably 1 to 2% by mass, expressed as dry extract of the thickening agent.

Suitably, the curing composition may be substantially transparent or translucent once dried on the concrete element. Advantageously, the appearance of the pervious concrete is not modified or is only slightly modified. Advantageously, the curing composition during its application (before evaporation of the solvent) is not transparent. It is then possible, by a simple visual simple inspection, to monitor where the curing composition is spread over the concrete element.

The curing composition may further comprise a film-forming agent and/or hydrophobic agent.

The curing composition may comprise from 0.1% to 35%, preferably 1% to 25%, more preferably 5% to 15%, by mass, expressed as dry extract of the film-forming agent and/or hydrophobic agent;
from 0.1% to 5%, preferably 0.5% to 4%, more preferably 0.75% to 3%, most preferably 1 to 2% by mass, expressed as dry extract of the thickening agent; and
from 40% to 99.8%, preferably 50% to 95%, more preferably 60% to 90%, most preferably 80% to 90% by mass of the solvent.

The film-forming agent is for example an agent adapted to form a substantially continuous film covering the surface when it is applied onto a surface The film-forming agent may correspond to the active principle of a curing composition used in a known manner for standard concretes, that is to say, for a concrete with a porosity less than 10%. An example of a known curing composition corresponds to the curing composition commercialised by Chryso under the name CHRYSO-Cure HPE™.

The film-forming agent may then form, during the evaporation of the solvent, a substantially continuous and impervious film at least partially covering the concrete.

The film-forming agent may be selected, for example, from the group consisting of:
waxes, in particular paraffins;
polyvinyl acetates;
polyvinyl alcohols;
styrene-butadiene resins;
styrene-acrylate resins;
acrylate copolymers or other resins (for example epoxy);
rubbers;
siloxanes;
chlorinated rubbers;
and mixtures thereof.

The film-forming agent or the hydrophobic agent may comprise paraffin.

The hydrophobic agent is for example an agent adapted to increase water repulsion and/or reduce water absorption and penetration in the composition in which the hydrophobic agent is added. The hydrophobic agent may comprise silanes, siloxanes, silicones, siliconates or mixtures thereof.

The curing composition is intended to be used to cure a concrete, for example a pervious concrete or a concrete element comprising pervious concrete.

Preferably, the pervious concrete comprises, for one cubic meter of fresh concrete:

from 100 kg to 400 kg (preferably from 140 kg to 300 kg, more preferably from 200 kg to 300 kg) of a hydraulic binder; and from 1300 kg to 1800 kg (preferably from 1300 kg to 1600 kg, more preferably from 1300 kg to 1500 kg) of a coarse aggregate or a mix of coarse aggregates having an average size of particles varying from 3 to 20 mm (preferably from 3 to 10 mm, more preferably from 6 to 10 mm).

The hydraulic binder is a pulverulent material, which, mixed with water, forms a paste which sets and hardens as a result of hydration reactions, and which, after hardening, retains its strength and its stability, even under water. The setting process corresponds to the passage to the solid state by chemical hydration reaction of the hydraulic binder. The setting is generally followed by a hardening period which corresponds to the phase during which the mechanical strengths of the hydraulic binder increase at the end of the setting phase Preferably, the pervious concrete treated by the process according to the invention does not comprise sand, that is to say, aggregates having an average particle size varying from 0 to 4 mm.

The hydraulic binder forms a paste connecting the coarse aggregates whilst maintaining an interconnection between the voids of the concrete.

According to an embodiment, the pervious concrete has a density in the hardened state of 1,500 to 2,200 kg/m$^3$, preferably 1,600 to 1,900 kg/m$^3$.

According to an embodiment, the pervious concrete has a porosity, that is to say, a percentage of voids, in the hardened state of 10 to 40% by volume, preferably 18 to 30% by volume.

The permeability of the pervious concrete, measured according to the NF EN 12697-19 Standard, may vary from 0.01 mm/s to 1000 mm/s, preferably from 0.1 mm/s to 100 mm/s, more preferably from 1 to 20 mm/s.

According to an embodiment, the pervious concrete preferably has a compressive strength after 28 days greater than or equal to 6 MPa, preferably from 7 to 20 MPa.

The hydraulic binder may comprise cement, in particular Portland cement, a particulate material (for example an inorganic addition) having an average size of particles less than 100 µm, or a mix of particulate materials. The inorganic additions may comprise pozzolanic or non pozzolanic materials or a mixture thereof.

The average sizes and distributions of particles may be determined by laser granulometry (in particular using a Malvern MS2000 laser granulometer) for the particles with a size less than 63 µm, or by sieving for the particles with a size greater than 63 µm.

Suitable cements comprise the Portland cements described in << Lea's Chemistry of Cement and Concrete>>. Portland cements include slag cements, pozzolan cements, fly ash cements, calcined shale cements, limestone cements and composite cements. It is for example a cement of type CEM I, CEM II, CEM II, CEM IV or CEM V according to the NF EN 197-1 <<Cement>> Standard. The preferred cement for the invention is the CEM I or CEM II/A.

Preferably, the pervious concrete comprises, for one cubic meter of fresh concrete:

from 60 kg to 400 kg (preferably 80 kg to 300 kg, more preferably 150 kg to 300 kg) of Portland cement;

from 0 kg to 180 kg (preferably 0 kg to 120 kg, more preferably 0 kg to 90 kg) of the particulate material or the mix of particulate materials;

from 0.3 kg to 3 kg (preferably 0.3 kg to 2 kg, more preferably 0.3 kg to 1 kg), expressed as dry extract, of a plasticizer;

from 1300 kg to 1800 kg (preferably 1300 kg to 1600 kg, more preferably 1300 kg to 1500 kg) of the coarse aggregate or mix of coarse aggregates; and from 40 kg to 200 kg (preferably 40 kg to 100 kg) of water.

The coarse aggregate is generally a coarse aggregate of silica or limestone.

An example of particulate material corresponds to slag, in particular granulated blast furnace slag.

Suitable pozzolanic materials comprise silica fume, also known by the name of micro silica, which are, for example a by-product of the production of silicon or alloys of ferrosilicon. It is known to be a reactive pozzolanic material. Its main constituent is amorphous silicon dioxide. The individual particles generally have a diameter of approximately 5 to 10 nm. The individual particles can agglomerate to form agglomerates of 0.1 to 1 µm. The 0.1 to 1 µm agglomerates can agglomerate to form clusters of 20 to 30 µm. Silica fume generally has a BET specific surface of 10-30 m$^2$/g. The BET specific surfaces may be measured using a SA 3100 analyzer from Beckman Coulter using nitrogen as the adsorbed gas.

Other pozzolanic materials comprise fly ash, which generally have a D10 greater than 10 µm and a D90 less than 120 µm and have, for example, a D50 of from 30 to 50 µm. The D90, also written $D_V90$, corresponds to the 90$^{th}$ centile of the distribution by volume of the size of the grains, that is to say that 90% of the grains have a size smaller than the D90 and 10% have a size larger than the D90.

Other pozzolanic materials comprise aluminosilicate-rich materials such as metakaolin and natural pozzolans with volcanic, sedimentary, or diagenic origins.

Suitable non-pozzolanic materials comprise materials containing calcium carbonate (for example ground or precipitated calcium carbonate), preferably a ground calcium carbonate. The ground calcium carbonate may, for example, be Durcal® 1 (OMYA, France). The non-pozzolanic materials preferably have an average particle size of less than 5 µm, for example from 1 to 4 µm. The non-pozzolanic materials can be a ground quartz, for example, C800 which is a substantially non-pozzolanic silica filler, provided by Sifraco, France. The preferred BET specific surface (determined by known methods previously described) of the calcium carbonate or the ground quartz is from 2-10 m$^2$/g, generally less than 8 m$^2$/g, for example from 4 to 7 m$^2$/g, preferably less than approximately 6 m$^2$/g. The precipitated calcium carbonate is also a suitable non-pozzolanic material. Individual particles generally have a (primary) size of the order of 20 nm. Individual particles agglomerate in aggregates having a (secondary) size of 0.1 to 1 µm. The aggregates themselves, having a (secondary) size of 0.1 to 1 µm, can form clusters having a (ternary) size greater than 1 µm.

A single non-pozzolanic material of mixture of non-pozzolanic materials may be used, for example ground calcium carbonate, ground quartz or precipitated calcium carbonate or a mixture thereof. A mixture of pozzolanic materials or a mixture of pozzolanic and non-pozzolanic materials may also be used.

The concrete treated by the process according to the invention may be used in association with reinforcing elements, for example metal fibres and/or organic fibres and/or glass fibres and/or other reinforcing elements.

The expression <<plasticizer/water reducer>>, is to be understood according to the present invention as an admixture, which, without modifying the consistency, makes it possible to reduce the water content of a given concrete, or which, without modifying the water content, increases the slump/spread of the concrete, or which produces the two effects at the same time. The NF EN 934-2 Standard specifies that the water reduction should be greater than 5%. Water reducers may, for example, have a base of lignosulfonic acids, hydroxycarboxylic acids or treated carbohydrates and other specialised organic compounds, for example glycerol, polyvinyl alcohol, sodium alumino-methyl-siliconate, sulfanilic acid and casein.

The plasticizer may moreover be a superplasticizer. The expression <<superplasticizer>> or <<superfluidizer>> or <<super water reducer>>, is to be understood as a water reducer, which makes it possible to reduce by more than 12% the quantity of water required to produce a concrete (NF EN 934-2 Standard). A superplasticizer has a fluidizing action inasmuch as, for a same quantity of water, the workability of the concrete increases by the presence of the superplasticizer. Superplasticizers have been broadly classified into four groups: sulfonated naphthalene formaldehyde condensate (SNF) (generally a sodium salt); or sulfonated melamine formaldehyde condensate (SMF); modified lignosulfonates (MLS); and others. New generation superplasticizers comprise polycarboxylic compounds, for example polyacrylates. The superplasticizer is preferably a new generation superplasticizer, for example a copolymer comprising polyethylene glycol as graft chain and carboxylic functions in the main chain such as a polycarboxylic ether. The ADVA® Flow 400 admixture is a plasticizer of the polyoxy ethylene polycarboxylate glycol (PCP) type. Sodium polycarboxylate-polysulphonates and sodium polyacrylates may also be used. In order to reduce the total alkali content, the superplasticizer may be used as a calcium rather than a sodium salt.

Other admixtures may be added to the concrete treated by the process according to the invention, for example, an antifoaming agent (for example, polydimethylsiloxane). The admixtures may also correspond to silicones in the form of a solution, a solid or preferably in the form of a resin, an oil or an emulsion, preferably in water. The quantity if such an agent in the concrete is generally at most five parts by weight relative to the cement.

The concrete may also comprise a hydrophobic agent to increase water repellency and reduce the absorption of water and penetration in solid structures comprising the concrete treated by the process according to the invention. Examples of agents comprise silanes, siloxanes, silicones and siliconates; commercially available products comprise liquid products and solvent-dilutable solid products, for example granular products.

The concrete may comprise a thickening agent and/or an agent modifying the flow limit (generally in order to increase the viscosity and/or the flow limit). Such agents comprise: derivatives of cellulose, for example water-soluble cellulose ethers, for example sodium carboxymethyl cellulose, sodium methyl cellulose, sodium ethyl cellulose, sodium hydroxyethyl cellulose and sodium hydroxypropyl cellulose; alginates; and xanthan, carrageenan or guar gum. A mix of these agents may be used.

The concrete may comprise an internal curing agent to reduce water losses even more during the setting and during the first days of the concrete hardening process. The curing agent is then present in the mass of the concrete. Examples of curing agents are paraffin and the product commercialised under the name of Rheocure 736 by BASF.

The concrete may comprise an activating agent to improve the hydration reactions of the vitreous materials. Examples of such agents comprise sodium and/or calcium salts.

The concrete may comprise an accelerator and/or an air-entraining agent and/or a retarder.

Preferably, the concrete has a <<Vicat>> setting time of 2 to 18 hours, for example from 4 to 14 hours.

The mass water/cement ratio of the concrete treated by the process according to the invention may vary if substitutes to the cement are used, more particularly pozzolanic materials. The water/binder ratio is defined as the mass ratio between the quantity of water W and the sum of the quantities of cement and all the pozzolanic materials: it is generally from 0.15 to 0.4, preferably from 0.3 to 0.4.

The volume of paste (which comprises the cement, the water, the plasticizer and the particulate pozzolanic or non-pozzolanic material(s) is generally from 100 to 200 liters per cubic meter of fresh concrete, preferably from 120 to 160 liters per cubic meter of fresh concrete.

The pervious concrete may be prepared by known methods, in particular the mixing of the solid components and water, the placing then the hardening. In order to prepare the pervious concrete, the constituents are mixed with water. The following mixing order may, for example, be adopted: add the aggregates and a fraction of the water; mix; add the pulverulent constituents of the matrix (hydraulic binder, filling agent); mix; introduction of the remaining water and the admixtures; mix. In the mix of the components of the pervious concrete, the materials in the form of particles other than the cement may be introduced as dry pre-mixes of powders or diluted or concentrated aqueous suspensions.

An element of pervious concrete is preferably obtained by pouring the pervious concrete into a mould or formwork and optionally by surface compaction of the pervious concrete in the fresh state. Surface compaction of the pervious concrete may be carried out with any type of tool, in particular a ruler, a paving machine, a roller and/or a vibrator, in one or more steps.

The curing process according to the present invention of the concrete element is applied after pouring the concrete, preferably after the surface compaction step of the concrete element. The process may comprise at least partially covering a surface of the element with a layer of the curing composition as previously defined when the concrete is in the fresh state, not long after pouring the concrete. Preferably, the covering is substantially complete.

Preferably, the curing composition is sprayed onto the concrete element according to the curing process of the present invention.

The application of the layer is preferably carried out using a sprayer. Suitably, the quantity of the sprayed curing composition is from 150 g/m$^2$ to 1500 g/m$^2$, preferably from 200 g/m$^2$ to 1200 g/m$^2$, more preferably from 300 g/m$^2$ to 1000 g/m$^2$ of concrete. Suitably, the layer is left for at least 10 days, preferably for at least 5 days and is suitably transparent or translucent after drying. Once hardened, the layer may be removed by abrasion, for example by rubbing, without degrading the surface of the concrete.

The dynamic viscosity of the curing composition as described in the description and in the accompanying claims refers to a dynamic viscosity measured with a Brookfield viscosity meter at 20° C., the RVTDV-II model, for example at 50 rpm.

In this specification, including the accompanying claims, particle size distributions and particle sizes are as measured using a Malvern MS2000 laser granulometer. Measurement is effected in ethanol. The light source consists of a red He—Ne laser (632 nm) and a blue diode (466 nm). The optical model is that of Mie and the calculation matrix is of the polydisperse type.

The apparatus is checked before each working session by means of a standard sample (Sifraco C10 silica) for which the particle size distribution is known.

Measurements are performed with the following parameters: pump speed 2300 rpm and stirrer speed 800 rpm. The sample is introduced in order to establish an obscuration between 10 and 20%. Measurement is effected after stabilisation of the obscuration. Ultrasound at 80% is first applied for 1 minute to ensure the de-agglomeration of the sample. After about 30 s (for possible air bubbles to clear), a measurement is carried out for 15 s (15000 analysed images). Without emptying the cell, measurement is repeated at least twice to verify the stability of the result and elimination of possible bubbles.

Values given in the description and the specified ranges generally correspond to average values obtained with ultrasound.

Particle sizes greater than 200 µm are generally determined by sieving.

The present invention provides also the curing composition used according to the curing process of the present invention.

Examples illustrating the invention without limiting its scope are described relative to the FIGURE, which represents the evolution curves of the dynamic viscosity of the curing composition relative to the pH at 20° C.

EXAMPLES

The present invention is described by the following examples provided for non-limiting purposes. The materials sued in the following examples are available for the following suppliers:

| Products or materials | Suppliers |
|---|---|
| Cement Saint Pierre La Cour | Lafarge, France |
| Aggregates 6/10 | Lafarge, site de Cassis (France) |
| ADVA ® Flow 400 | Grace |
| CHRYSOCure HPE ™ | Chryso |
| Chitosan 342 ™ | France Chitine |
| Acticide MBS 2550 ™ | Thor Chemicals |

The Portland cement (Saint Pierre La Cour) had a D90 less than 40 µm. It was a cement of the CEM I 52.5N CE CP2 type. The ADVA® Flow 400 admixture was a plasticizer of the polyoxy ethylene polycarboxylate glycol (PCP) type. The CHRYSOCure HPE™ compound was a curing agent comprising an emulsion of paraffin. The Chitosan 342™ product was chitosan originating from shrimp shell. The Acticide MBS 2550™ was an agent to destroy bacteria, fungi and algae.

Formulation of Pervious Concrete

The formulation (1) of pervious concrete used to carry out the tests is described in the following Table (1):

TABLE 1

| Formulation (1) of pervious concrete | |
|---|---|
| Component | Mass of the component in kg per cubic metre of fresh concrete |
| Saint Pierre La Cour Cement | 260 |
| Coarse aggregates 6/10 | 1500 |
| Superplasticizer ADVA ® Flow 400 (having 30% dry extract of active material) | 2.6 |
| Water | 77.7 |

The water/cement ratio was 0.3. The volume of paste of hydraulic binder was 160 liters per cubic meter cube of fresh concrete.

Preparation Method of the Concrete

The pervious concrete was produced in a mixer of the Zyclos type (50 liters). The entire operation was carried out at 20° C. The preparation method comprised the following steps:

Put the aggregates in the bowl of the mixer;
At T=0 second: begin the mixing and add simultaneously the wetting water in 30 seconds, then continue to mix for 30 seconds;
At T=1 minute: stop the mixing and leave to rest for 4 minutes;
At T=5 minutes: add the hydraulic binder;
At T=6 minutes: mix for 1 minute;
At T=7 minutes: add the mixing water in 30 seconds (whilst continuing to mix); and
At T=7 minutes and 30 seconds: mix for 2 minutes.

Measurement of the Intrinsic Viscosity of a Curing Agent

The viscosity of the curing composition was measured with a Brookfield viscosimeter at 20° C., model RVTDV-II, at 50 rpm using the n° 5 rod.

Method to Measure the Water Loss of a Concrete

A mould of mass $m_0$ was used. The mould was filled with pervious concrete in the fresh state. The fresh concrete was then levelled using a ruler. The mould filled with fresh concrete was weighed (mass $m_1$). The curing treatment was carried out (a curing composition was deposited or the fresh concrete was covered with a plastic tarpaulin). The mass $m_2$ of the curing product (curing composition or tarpaulin) which was deposited on the fresh concrete was measured. The mould filled with the concrete (and covered by the curing product) was then weighed several times (mass $m_3$). The total mass of lost water $m_e$ at a given moment corresponded to the sum of the total initial mass of the mould filled with the concrete and the curing product minus the mass of the mould filled with the concrete (and covered by the curing product) at the given moment:

$$m_e = (m_1 + m_2) - m_3$$

When a curing composition was deposited on the concrete, the total mass of lost water corresponded to the sum of the mass $m_{e1}$ of lost water by the concrete and the mass $m_{e2}$ of lost water by the curing product:

$$m_e = m_{e1} + m_{e2}$$

When the concrete was covered by a plastic tarpaulin, the tarpaulin was dry. The mass $m_{e2}$ was therefore nil.

When considering that the water of the curing composition evaporates rapidly and by calling DE, the percentage by mass of dry extract, one obtains:

$$m_{e1} = m_e - [1 - (DE)/100] * m_2$$

Example 1

A comparison curing composition was made. The curing composition corresponded to an emulsion of paraffin having 15% dry extract measured after 30 minutes of drying at 160° C. (comparative example).

A first curing composition according to the invention was made. The first curing composition corresponded to an acidified aqueous solution comprising 2.2% by mass of the Chitosan 342™ product. The first curing composition corresponded to the formulation described in the following Table (2):

TABLE 2

| Product | Quantity (g) | Percentage (%) by mass relative to the curing composition |
|---|---|---|
| Water | 650 | 96.8 |
| Chitosan 342 ™ | 15 | 2.2 |
| Solution of hydrochloric acid (32%) | 7 | 1.0 |

A second curing composition according to the invention was made. The second curing composition corresponded to the formulation described in the following Table (3):

TABLE 3

| Product | Quantity (g) | Percentage (%) by mass relative to the curing composition |
|---|---|---|
| Water | 700 | 68.8 |
| Chitosan 342 ™ | 10 | 1.0 |
| Solution of hydrochloric acid (32%) | 5 | 0.5 |
| CHRYSOCure HPE ™ (dry extract 30%) | 300 | 29.5 |
| Acticide MBS 2550 ™ | 2 | 0.2 |

The second curing composition was obtained by mixing the water, the aqueous solution of hydrochloric acid (HCl, 32%) and the Chitosan 342™ product for 30 minutes by heating the mixture to 50° C. The heating was then stopped. The CHRYSOCure HPE™ product and the Acticide MBS 2550™ product were then added.

The evolution of the dynamic viscosity of the curing compositions according to the pH was measured. The results are given in the following Table (4):

TABLE 4

| | pH | 2 | 4.5 | 5.2 | 6.6 | 7.2 | 8 | 12 |
|---|---|---|---|---|---|---|---|---|
| Dynamic viscosity (Pa·s) | Comparison curing composition | 0.012 | 0.012 | 0.012 | 0.012 | 0.012 | 0.015 | 0.015 |
| | First curing composition | 0.46 | 0.52 | 0.6 | 1.15 | 1.25 | 1.2 | 1.1 |
| | Second curing composition | 0.09 | 0.12 | 0.15 | 0.2 | 0.33 | 0.4 | 0.25 |

As shown in FIG. 1, the dynamic viscosity of the comparison curing composition did not substantially vary as a function of the pH (curve C1). The evolution curve C2 of the dynamic viscosity of the first curing composition successively comprised a first portion where the dynamic viscosity dynamic viscosity did not vary much (pH up to 5) and was within the order of 0.5 Pa·s, a second portion where the dynamic viscosity greatly increased (pH varying from 5 to 7.5) and a third portion where the dynamic viscosity did not vary much (pH greater than 7.5) was in the order of 1.15 Pa·s. The evolution curve C3 of the dynamic viscosity of the second curing composition successively comprised a first portion where the dynamic viscosity did not vary much (pH up to 6.5) and was within the order of 0.15 Pa·s, a second portion where the dynamic viscosity greatly increased (pH varying from 6.5 to 8) and a third portion where the dynamic viscosity did not vary much (pH greater than 8) and was within the order of 0.3 Pa·s. the third portion in curves C2 and C3, could correspond to the formation of lumps in the curing composition and to a phase separation between the solvent and the thickening agent. The measurement of the dynamic viscosity would then be difficult and a slight decrease of the measured dynamic viscosity could be observed.

Example 2

A pervious concrete was produced according to formulation (1).

The concrete was poured in three moulds in order to produce three parallelepiped slabs of pervious concrete having a length of 30 cm, a width of 20 cm and a height of 8 cm.

For each slab, the mass $m_0$ of the corresponding mould was measured and the mass $m_1$ of the mould filled with the fresh concrete was measured.

No curing treatment was done on the first slab.

The curing treatment of the second slab was done by covering the visible side of the concrete with a plastic tarpaulin. The mass $m_2$ of the plastic tarpaulin deposited on the fresh concrete was 30 g.

The curing treatment of the third slab was done by spraying a curing composition on the visible side of the concrete. The curing composition corresponded to the mix of 50% of the CHRYSOCure HPE™ admixture and 50% of an aqueous solution acidified with hydrochloric acid comprising 3.3% by mass of chitosan. The dry extract of the curing composition was 15% (measured after 30 minutes of drying at 160° C.). At the time of production of the curing composition, the measured dynamic viscosity was 0.8 Pa·s and the pH of the curing composition was 5.8. The curing composition was sprayed on the visible side of the fresh concrete with 667 g of the curing composition per square meter of concrete. The mass $m_2$ of the curing composition deposited on the fresh concrete was 40 g.

The mass $m_{e1}$ of lost water by the concrete was measured for each slab at 20° C., 65% relative humidity and without wind. The results are given in the following Table (5):

TABLE 5

| | Slab | 1 | 2 | 3 |
|---|---|---|---|---|
| | Curing treatment | none | Plastic tarpaulin | Curing composition |
| | Mass $m_0$ of the empty mould (g) | 1462 | 1484 | 1462 |
| | Mass $m_1$ of the mould filled with fresh concrete (g) | 10957 | 11111 | 9793 |
| Relation between the mass of lost water by the concrete $m_{e1}$ relative to the initial mass of the concrete $m_1$ (%) | Measurement at 5 mins | — | — | 0 |
| | Measurement at 1 h 30 mins | — | — | 0 |
| | Measurement at 3 h | — | — | 0 |
| | Measurement at 4 h | 8.3 | 1.2 | 0 |
| | Measurement at 5 h | 10.3 | 1.2 | 0 |
| | Measurement at 4 days | 10.5 | 1.2 | 4.1 |

Example 3

A pervious concrete was produced according to formulation (1).

The concrete was poured in six moulds in order to produce three parallelepiped slabs of pervious concrete having a length of 30 cm, a width of 20 cm and a height of 8 cm.

The mass $m_0$ of the corresponding mould was measured and the mass $m_1$ of the mould filled with the fresh concrete was measured for each slab.

No curing treatment was done on the first slab.

The curing treatment of the second slab was done by covering the visible side of the concrete with a plastic tarpaulin. The mass $m_2$ of the plastic tarpaulin deposited on the fresh concrete was 16 g.

The curing treatment of the third slab was done by spraying a curing composition on the visible side of the concrete. The curing composition corresponded to a diluted aqueous solution of the CHRYSOCure HPE™ admixture. The dry extract of the curing composition was 15% (measured after 30 minutes of drying at 160° C.).

At the time of production of the curing composition comprising the diluted CHRYSOCure HPE™ admixture, the measured dynamic viscosity was 0.015 Pa·s. The curing composition was sprayed on the visible side of the fresh concrete with 617 g of the curing composition per square meter of concrete, which corresponded to 93 g of dry matter of the curing composition per square meter of concrete. The mass $m_2$ of the curing composition deposited on the fresh concrete was 37 g.

A curing composition having the formulation described in the previous Table (3) was used as curing treatment for the fourth slab.

The curing composition was obtained by mixing the water, the aqueous solution of hydrochloric acid (HCl, 32%) and the Chitosan 342™ product for 30 minutes by heating the mixture to 50° C. The heating was then stopped. The CHRYSOCure HPE™ product and the Acticide MBS 2550™ product were then added.

The dry extract of the curing composition was 10.0% (measured after 30 minutes of drying at 160° C.). At the time of production of the curing composition, the measured dynamic viscosity was 0.25 Pa·s and the pH of the curing composition was 6.4. The curing composition was sprayed on the visible side of the fresh concrete with 617 g of the curing composition per square meter of concrete, which corresponded to 62 g of dry matter of the curing composition per square meter of concrete. The mass $m_2$ of the curing composition deposited on the fresh concrete was 37 g.

The same curing composition used for the fourth slab was used for the fifth slab. The curing composition was sprayed on the visible side of the fresh concrete with 967 g of the curing composition per square meter of concrete, which corresponded to 97 g of dry matter of the curing composition per square meter of concrete. The mass $m_2$ of the curing composition deposited on the fresh concrete was 58 g.

A curing composition having the formulation described in the previous Table (2) was used as curing treatment for the sixth slab. The dry extract of the curing composition was 2.6% (measured after 30 minutes of drying at 160° C.). At the time of production of the curing composition, the measured dynamic viscosity was 0.7 Pa·s and the pH of the curing composition was 5.4. The curing composition was sprayed on the visible side of the fresh concrete with 1500 g of the curing composition per square meter of concrete, which corresponded to 40 g of dry matter of the curing composition per square meter of concrete. The mass $m_2$ of the curing composition deposited on the fresh concrete was 90 g.

The mass $m_{e1}$ of lost water by the concrete was measured for each slab at 350° C., 35% relative humidity and with wind at 3 m/s. The results are given in the following Table (6):

TABLE 6

| | Slab | 1 | 2 | 3 | 4 | 5 | 6 |
|---|---|---|---|---|---|---|---|
| | Curing treatment | None | Plastic tarpaulin | Curing composition CHRYSOCure HPE ™ | Curing composition CHRYSOCure HPE ™/chitosan | Curing composition CHRYSOCure HPE ™/chitosan | Curing composition chitosan |
| | Mass $m_0$ empty mould (g) | 1447 | 1473 | 1475 | 1456 | 1457 | 1474 |
| | Mass $m_1$ mould + fresh concrete (g) | 10985 | 10435 | 11014 | 11061 | 11178 | 10823 |
| Relation between the mass of lost water by the concrete $m_{e1}$ and the initial mass of the concrete $m_1$ (%) | 1 h | 13.8 | 1.5 | 0.0 | 0.5 | 0.0 | 3.2 |
| | 2 h | 22.6 | 2.8 | 3.4 | 7.4 | 2.0 | 15.4 |
| | 3 h | 26.9 | 4.5 | 8.9 | 11.9 | 7.0 | 21.1 |
| | 4 h | 31.6 | 5.2 | 13.5 | 16.7 | 11.3 | 25.0 |
| | 5 h | 35.0 | 6.7 | 17.8 | 20.8 | 15.3 | 30.2 |
| | 6 h | 39.1 | 9.1 | 23.1 | 25.8 | 19.1 | 34.3 |
| | 7 h | 40.7 | 10.6 | 25.1 | 28.6 | 20.9 | 37.2 |
| | 24 h | 57.2 | 22.1 | 45.5 | 42.4 | 33.5 | — |

In the presence of wind, the drying process of slab n° 1 without curing treatment in Example 3 was accelerated compared to slab n° 1 without curing treatment in Example 2.

The best protection against drying was obtained by covering the slab n° 2 of Example 3 with a plastic tarpaulin.

The drying of slab n° 5 of Example 3 covered by a curing composition according to an embodiment of the present invention was less than the drying of slab n° 3 of Example 3 covered by a known curing composition for similar protection against drying.

The quantity of dry matter used to cover slab n° 4 of Example 3 by a curing composition according to an embodiment of the present invention was less than the quantity of dry matter used to cover slab n° 3 of Example 3 of a known curing composition for similar protection against drying.

The drying of slab n° 6 of Example 3 covered by a curing composition according to an embodiment of the present invention was less than the drying of slab n° 1 of Example 3 in the absence of curing treatment and therefore made it possible to postpone the covering of the concrete element with water-imbibed cloths, surface plastic films or impervious papers.

The invention claimed is:

1. A process for curing a concrete element comprising at least partially coating the element with a curing composition during curing of the concrete element, said composition comprising a solvent and a thickening agent, said thickening agent being insoluble at a pH of the curing composition greater than 12 and being soluble in the solvent for a solubility range of pH of the curing composition, the upper limit of the solubility range being less than 11, wherein the curing composition has a first dynamic viscosity less than 0.8 Pa·s when the pH is in the solubility range and a second dynamic viscosity greater than 2 to 5 times the first dynamic viscosity when the pH is between the upper limit of the solubility range and 12, and wherein the curing composition comprises from 40% to 99.9% by mass of the solvent and from 0.1% to 5% by mass, expressed as dry extract, of the thickening agent.

2. The process according to claim 1, wherein the thickening agent comprises polyamines or a derivative thereof; polyimines or a derivative thereof; or a mixture thereof.

3. The process according to claim 2, wherein the thickening agent comprises chitosan.

4. The process according to claim 1, wherein the curing composition further comprises a film-forming agent and/or a hydrophobic agent.

5. The process according to claim 4, wherein the curing composition comprises:

from 0.1% to 35% by mass, expressed as dry extract, of a film-forming agent and/or a hydrophobic agent;
and
from 40% to 99.8% by mass of the solvent.

6. The process according to claim 4, wherein the film-forming agent or the hydrophobic agent comprises paraffin.

7. The process according to claim 1, wherein the element comprises pervious concrete.

8. The process according to claim 1, wherein the curing composition is sprayed onto the concrete element.

9. The process according to claim 1, further comprising, after the coating, removing the curing composition that is coated on the concrete element.

10. The process according to claim 9, wherein the removing occurs after at least 5 days.

11. The process according to claim 9, wherein the removing is by abrasion.

* * * * *